June 17, 1924.
L. W. GREVE
1,498,450
PROCESS OF FORGING TOOL CHUCKS
Filed May 3, 1922
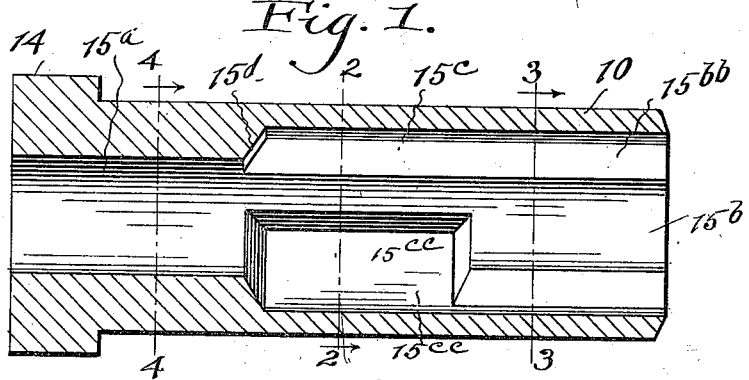
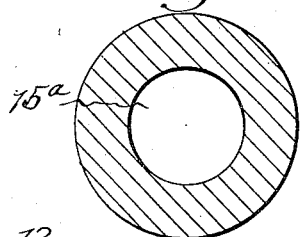
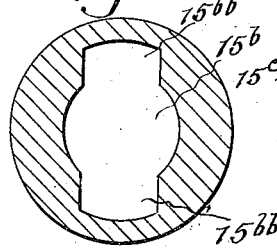
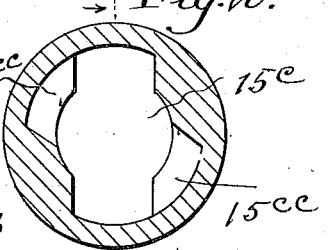
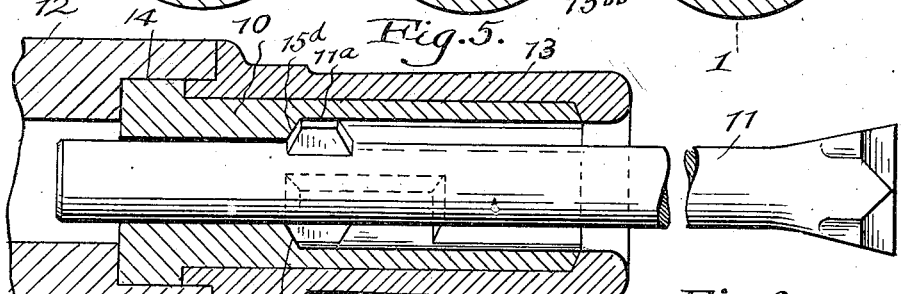
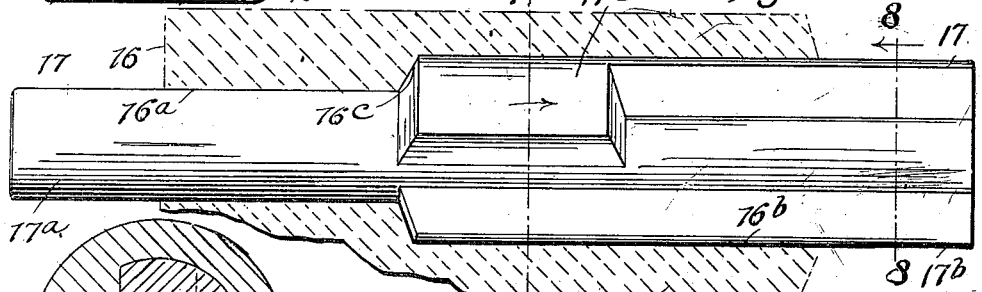

Patented June 17, 1924.

1,498,450

UNITED STATES PATENT OFFICE.

LOUIS W. GREVE, OF CLEVELAND, OHIO, ASSIGNOR TO THE CLEVELAND ROCK DRILL COMPANY, OF CLEVELAND, OHIO, A CORPORATION OF OHIO.

PROCESS OF FORGING TOOL CHUCKS.

Application filed May 3, 1922. Serial No. 558,184.

*To all whom it may concern:*

Be it known that I, LOUIS W. GREVE, a citizen of the United States, residing at Cleveland, in the county of Cuyahoga and State of Ohio, have invented a certain new and useful Improvement in Processes of Forging Tool Chucks, of which the following is a full, clear, and exact description.

This invention relates to a tool chuck and to a process of producing the same and similar articles.

In one aspect the present invention relates to an improved article of manufacture in the form of a one-piece forged tool chuck adapted to be employed with tools such as rock drills to receive a drilling steel, and in another aspect the invention relates to a process by which an article such as the chuck referred to, having irregular or offset interior cavities may be forged in one piece, with the irregular interior opening formed during the forging operation.

Heretofore, articles having irregular offset openings on the interior, so located and shaped that they cannot be produced by a machining process, have had to be formed either of cast metal or of a plurality of separate pieces secured together.

Chucks used on air drills of the reciprocating hammer type are commonly provided with an opening extending therethrough adapted to receive the shank of a drilling steel, this opening having between its ends laterally disposed or offset cavities which receive lugs on the drilling steel and admit of a slight turning motion being imparted to the steel without liability of the steel being withdrawn from the chuck when the steel is pulled from the opening being drilled in the rock. Chucks used for this purpose cannot be formed of cast metal in view of the very severe treatment to which they are subjected, and have usually been formed of three separate pieces arranged end to end and fastened or locked together by a surrounding member in the form of a collar.

By the present invention I provide a one-piece unitary forged article having an interior opening provided with an irregularly shaped or offset cavity which may have any shape or contour, and this is accomplished by forging a piece of metal around a core of irregular shape corresponding to the opening to be formed in the forged piece, and subsequently removing the core to leave the opening of the proper shape in the piece which has been forged.

In carrying out this process a core is utilized which is of sufficient hardness to resist without being deformed, the pressure of the forging dies, and its melting temperature is such that it will not soften or become fused in the short time that it is in the heated piece being forged, though it preferably has a lower melting point than the metal being forged so that it can be removed subsequently by melting it out.

The invention may be further briefly summarized as consisting in the steps of the improved process, and in the new article of manufacture resulting therefrom which will be described in the specification and set forth in the appended claims.

In the accompanying sheet of drawings, Fig. 1 is a longitudinal sectional view of a chuck for a reciprocating hammer rock drill formed in accordance with my invention, this section being taken along the line 1—1 of Fig. 2, looking in the direction indicated by the arrows; Figs. 2, 3 and 4 are transverse sectional views substantially along the lines 2—2, 3—3 and 4—4 of Fig. 1, looking in the direction indicated by the arrows; Fig. 5 is a view of the end of a rock drill equipped with my improved chuck in which the drilling steel is inserted ready for operation; Fig. 6 is a view showing in elevation the core which is used in carrying out my process, and showing by dotted lines the surrounding body of metal which is to be forged around the core to produce an opening therein corresponding to the shape of the core; Figs. 7 and 8 are transverse sectional views along the lines 7—7 and 8—8 of Fig. 6, Fig. 7 showing how the piece is forged around the irregular shape of the core.

Referring now to the drawings and particularly to Figs. 1 to 4 wherein I have shown in detail the construction of my improved chuck, and to Fig 5 wherein I have shown the chuck mounted in the end of a rock drill, generally of the reciprocating hammer type and containing a drilling steel which I have indicated at 11, it will be observed that this chuck exteriorly is cylindrical, being received within the two parts 12 and 13 of the drill body, and having at its inner end an external annular shoulder 14, which is clamped between shoulders or abutments of the drill body parts 12 and 13.

This chuck is in this instance formed in one piece, and is preferably a steel forging made as hereinafter described. The chuck has an opening extending therethrough, this opening being of different shape at various points along the length of the chuck. In fact, the opening through three different portions or sections of the chuck has three distinct shapes. Near the inner end of the chuck the opening is annular or cylindrical as shown at $15^a$. For a distance inward from the outer or opposite end of the chuck the opening is elongated and of the shape shown at $15^b$ in Fig. 3, this opening being part round with oppositely disposed ways indicated at $15^{bb}$. At and in the region of the center of the chuck the opening is of the irregular shape shown at $15^c$ in Fig. 2, the ways $15^{bb}$ of Fig. 3 having been widened out to form a pair of oppositely disposed arc-shaped cavities $15^{cc}$, both of which are indicated in Fig. 2, and one of which is shown in Fig. 1. It is the peculiar section or shape of the opening at the middle portion of the chuck that makes this chuck difficult to produce, and has heretofore required that it be formed in three sections provided respectively with openings corresponding to the three openings shown in Figs. 2, 3 and 4.

The purpose of the offset or laterally disposed cavities $15^{cc}$ located in the region of the middle of the chuck is to permit a turning movement to be imparted to the drilling steel when the drill is in operation; that is to say, permit the drilling steel to turn slightly in the chuck and also to have a slight longitudinal movement in the chuck but without liability of the drilling steel pulling out of the chuck when the steel is removed from the hole that has been drilled in the rock. In order that the results or advantages just stated may be attained with a chuck having an interior end to end opening as described, the drilling steel is provided between its ends with a pair of oppositely disposed lugs $11^a$ which in cross sectional shape corresponds to the ways $15^{bb}$ of Fig. 3. In fact, the cross section of the drilling steel taken through the lugs corresponds to the shape $15^b$ of the interior opening of the chuck shown in Fig. 3. This permits the drill to be inserted in the chuck by sliding the lugs through the ways $15^{bb}$, and when the lugs reach the cavities $15^{cc}$, the drilling steel is turned, the arcuate length of the cavities being such that the drilling steel may turn in the chuck but still is prevented from being accidentally withdrawn from the chuck when it is being drawn out of the opening which has been drilled.

It may be observed in passing, that the ends of the cavities terminate in inclined shoulders $15^d$, and it is against the inner shoulders that the lugs $11^a$ of the drilling steel bear when hammer blows are not being struck against the inner end of the drilling steel.

In carrying out my invention I use a tubular piece of steel which is indicated at 16 in Fig. 6. It is immaterial whether this piece or block of steel is cylindrical exteriorly prior to the forging operation, but it may be so, this being unimportant inasmuch as after the piece is forged, the exterior can be easily machined or turned to the right diameter. I prefer, however, to start with a piece of round bar, and this is drilled from end to end, the opening having two diameters, one designated $16^a$ corresponding to the size of the cylindrical portion $15^a$ of the opening through the chuck, and the other designated $16^b$ being of larger diameter and corresponding to the maximum diameter measured from the arc-shaped outer end of one way $15^{bb}$ to the arc-shaped outer end of the opposite way $15^{bb}$ of Fig. 3. At the junction of the portions $15^a$ and $16^b$ of the opening through the piece, an inclined shoulder $16^c$ is provided corresponding in its inclination to the angle of the shoulders $15^d$ of the chuck.

I then insert in the hollow bar or piece 16, a core having a shape corresponding to the irregular opening which is to be formed in the chuck. A core shaped to produce a chuck opening having the differently shaped portions $15^a$, $15^b$ and $15^c$ illustrated in Figs. 1 to 4 is shown at 17 in Figs. 6, 7 and 8. At one end, this core has a cylindrical portion $17^a$, this portion having a diameter corresponding to and fitting into the portion $16^a$ of the opening drilled in the bar 16. Additionally the core has at its other end an irregularly shaped elongated portion $17^b$, that is to say, irregular and elongated in cross section and corresponding to the elongated portion $15^b$ of the opening to be formed in the chuck, and between the portions $17^a$ and $17^b$ the core has an irregularly shaped portion $17^c$ corresponding precisely to the shape of the portion $15^c$ of the chuck opening, this portion having lugs which correspond in shape to the cavities $15^{cc}$, these lugs having peripheral rounded portions and tapered ends and sides as do the cavities.

When this core is fitted into the drilled bar, the portions $17^b$ and $17^c$ just fit into the large part of the round opening drilled in the bar 16, and it is inserted in the bar until the tapered shoulder of the portion $17^c$ bears against the annular inclined internal shoulders $16^c$ formed in the bar.

It is not necessary that the portions $17^a$ and $17^b$ of the core correspond in length to the length of the portions $15^a$ and $15^b$ of the chuck opening, and, in fact, these portions of the core preferably and generally do project beyond the ends of the bar 16 as shown in Fig. 6.

Then the bar 16 with the inserted core (the bar having been heated to a forging temperature prior to the insertion of the core) is placed in a suitable forging machine, which may be a forging press or a forging hammer, and the bar is forged until its interior shape corresponds to the exterior shape of the core. That is to say, the metal is pressed inwardly around or into the irregular portions 17$^b$ 17$^c$ of the core so that the bar from end to end corresponds to the shape of the several portions of the core which the bar encloses.

It is important that the core resist without deformation, the pressure of the forging dies, and that it be not fused or softened by the heated bar during the forging operation.

Next the core is removed in any suitable manner but preferably by reheating the forged piece until the core is melted and runs out, leaving an opening in the forged piece corresponding to the shape of the core, and corresponding precisely to the shape of the interior of the chuck 10. This requires, of course, that the melting temperature of the core be below that of the steel used in forming the chuck.

I find that a core formed of brass answers all the requirements, for while brass has a considerably lower melting temperature than steel, the time or interval that the core is in the heated piece prior to the completion of the forging operation is so short that the forging is completed before sufficient heat can pass by conduction to the core to even soften it.

The forging dies may be so shaped as to finish the chuck exteriorly, or if desired, the forged piece can be turned down to produce a chuck having the desired exterior shape and diameter or diameters, it being, of course, essential that the hollow bar or piece 16 have sufficient stock to permit the metal to be pressed inward and become shaped to the core and at the same time leave enough metal to provide a smooth cylindrical chuck body.

It will thus be seen that I have not only provided a novel method of forging, but also a new article of manufacture consisting of a chuck having an irregular interior opening which heretofore could be produced so as to be suitable for practical use only by building up the chuck of a number of pieces.

Having described my invention, I claim:

1. The process of forging metal articles with an interior opening or cavity irregular in cross-section which comprises forging a body of metal about a substantially unyielding core inserted therein and having a portion shaped to correspond to said opening or cavity so as to cause the metal to be shaped interiorly to the shape of the core, and subsequently removing the core.

2. The process of forging a hollow metal article with an interior opening or cavity irregular in cross-section, which comprises forging a piece of metal about a core inserted therein and having a portion which is shaped to correspond to the opening or cavity and retains that shape under the forging pressure so that the metal interiorly conforms to the shape of the core, and subsequently removing the core.

3. The process of forging a metal article with an opening extending therethrough and with one or more axially displaced cavities leading therefrom, which comprises forging a hollow body about a core of sufficient hardness to resist the forging pressure shaped to correspond to said opening and cavity or cavities so that the metal conforms to the exterior shape of the core, and subsequently removing the core.

4. The process of forming hollow metal articles having an interior opening with an axially offset portion which comprises forging a hollow piece of metal about a core having a shape corresponding to the interior opening to be produced and formed of material which will enable the core to retain its shape under the pressure of forging and subsequently removing the core.

5. The process of forming hollow metal articles having an interior opening with one or more axially offset portions which comprises forging a hollow piece of metal about a core having a shape corresponding to the opening which the article is to have and formed of material which will enable the core to retain its shape under the forging pressure and which has a lower melting point than the metal from which the article is formed, and removing the core by melting it.

6. The process of forming a one-piece drill chuck having an opening extending therethrough for the shank of the drill, and having a laterally offset cavity leading from said opening between its ends adapted to receive a laterally projecting lug on the shank, which comprises forging a hollow body of metal around a core having an irregular shape corresponding to the shape of the opening to be formed in the chuck so as to cause the interior of said body of metal to conform to the irregular shape of the core, and subsequently removing the core and finishing the chuck exteriorly.

In testimony whereof, I hereunto affix my signature.

LOUIS W. GREVE.